United States Patent
Buchan et al.

[11] 3,757,189
[45] Sept. 4, 1973

[54] TEMPERATURE COMPENSATION FOR POSITIONING SYSTEM

[75] Inventors: William A. Buchan, Newport Beach; Richard J. Elliott, Costa Mesa, both of Calif.

[73] Assignee: Century Data Systems, Inc., Anaheim, Calif.

[22] Filed: Dec. 29, 1972

[21] Appl. No.: 319,326

[52] U.S. Cl. .............................................. 318/634
[51] Int. Cl. ...................................... G05d 23/275
[58] Field of Search ................................. 318/634

[56] References Cited
UNITED STATES PATENTS

| 2,844,775 | 7/1958 | Miller et al. | 318/634 |
| 3,122,688 | 2/1964 | Houpt | 318/634 |
| 3,646,420 | 2/1972 | Halfhill et al. | 318/634 |

*Primary Examiner*—B. Dobeck
*Attorney*—Bruce D. Jimerson

[57] ABSTRACT

The specification discloses an arrangement which compensates for temperature variations in the track positioning system of a rotating magnetic storage device having individual elements which are subjected to different temperatures and environments as a consequence of their physical location.

1 Claim, 3 Drawing Figures

TEMPERATURE COMPENSATION FOR POSITIONING SYSTEM

BACKGROUND OF THE INVENTION

In high density disk type storage devices it is extremely important to maintain the accuracy and repeatability of the positioning system over a wide temperature range. In most systems, the positioning is accomplished by reference to an optical grating which is located in a different environment than the head which is to be positioned with respect to a particular recording track on the surface of the magnetic disk. Two problems arise: 1) The grating scale length is correct only at some reference temperature (normally 68°F), and, 2) the difference in the temperatures of the various elements as a consequence of their physical location causes errors as a result of their changes in dimension. For example, the optical grating and carriage are typically referenced to a transducer mounted on the base plate in a rather isolated environment at some temperature $T_1$ whereas the head arm and disk are normally in a flow of air at a temperature $T_2$. While it is likely that the baseplate, carriage and grating temperatures will track fairly closely (at $T_1$), the disk and head arm will not.

Accordingly, it is a primary object of the present invention to provide an arrangement for compensating for overall temperature variations as well as temperature differences due to the specific environment of the individual elements.

Other objects and advantages of the present invention will be obvious from the detailed description of a preferred embodiment given herein below.

SUMMARY OF THE INVENTION

The invention comprises a pair of thermistor bridges which are excited by voltages proportional to the track location information. The first bridge generates an output which is functionally dependent upon the difference in temperature at two different environments. The second bridge produces an output which varies in accordance with the difference in temperature between one environment and a reference temperature. The outputs of both bridges are amplified and summed to generate a correction voltage which is proportional to the theoretical error which results from the temperature variations and differences for each track location.

DESCRIPTION OF A PREFERRED EMBODIMENT

Figure 1:
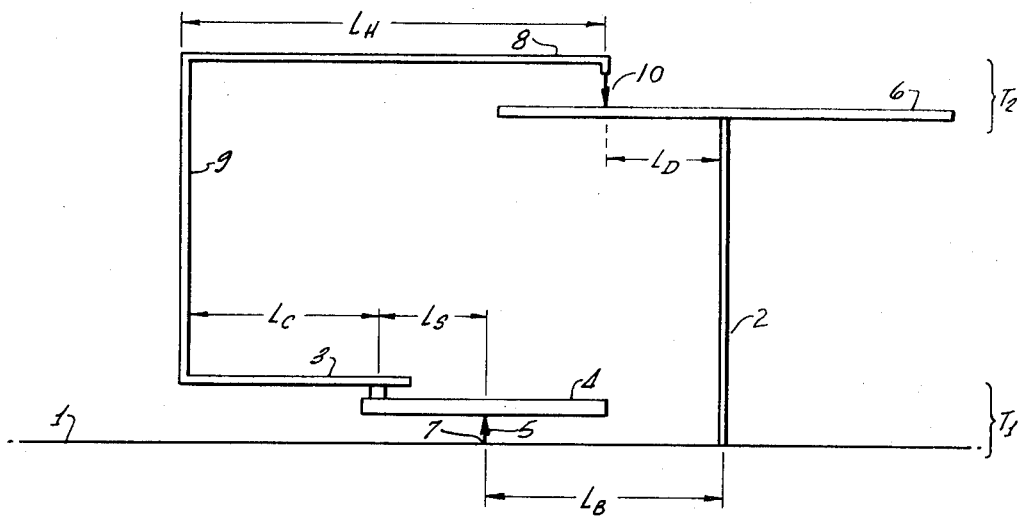
FIG. 1 is a diagrammatic representation of the elements showing how the positioning accuracy is influenced as a result of temperature variations and differences.

Adverting to the drawings, and particularly FIG. 1, a typical position system includes a base plate 1 which supports the center axis 2 of disk pack (illustrated as a single disk 6), a carriage 3 to which is mounted an optical grating 4, a transducer 5 for detecting the position of the grating with respect to a predetermined location 7 on the baseplate 1, a head tower 9 and head arm 8 which is moved in accordance with carriage 3 to position the head 10 at the desired track location on disk 6.

Figure 2:
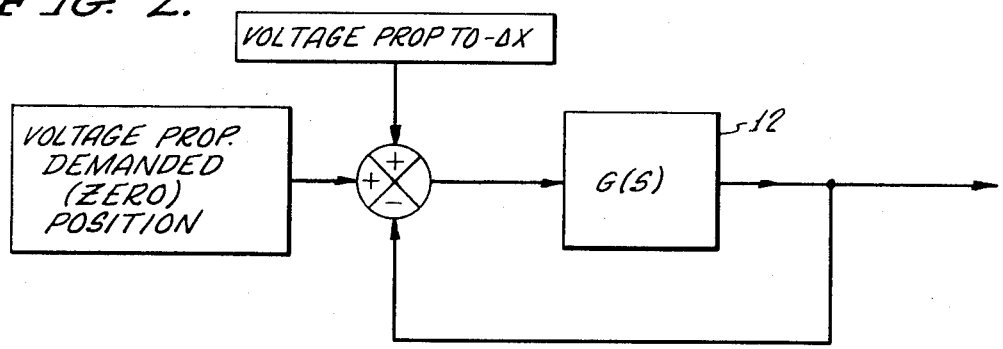
FIG. 2 is a block diagram showing how temperature errors could be compensated by summing a correction voltage with the position command.

The lengths of the various elements in the loop are as follows:
$L_H$ = length of head arm
$L_D$ = length of disk in loop
$L_C$ = length of carriage
$L_S$ = length of scale in loop (grating)
$L_B$ = length of base plate in loop The servo system operates to position the scale 4 accurately to the reference point 7, corresponding to the desired track location. If the number of tracks on the disk is $N$, and each track is separated by a pitch distance $P$, then for any desired track $X$, $$L_D = K_D + (N - X) P$$

where $K_D$ is the radius of the center track. Because of temperature variations, the scale length $L_S$ will be correct only at one temperature (this will normally be 68°F). Moreover, the disk 6, and head arm 8 are normally in a flow of air having a temperature $T_2$ whereas the base plate 1, transducer 5, grating 4 and carriage 3 are normally at a different temperature $T_1$. If the entire system is adjusted at some reference temperature $(T_F)$, scale clamping locations can be chosen such that, for the center track, $$L = K_S + (N - X) (P)$$

where $K_S$ is the length from the clamp to the center track
the location of the head on the disk will remain constant for any temperature variation as long as $T_1 = T_2$. In general, the temperatures of the elements will be different $(T_1 \neq T_2)$ and the head will deviate from the desired track location $\Delta X$ where $$\Delta X = \alpha_D [K_D + (N-X)P][T_2 - T_1] +$$
$$\alpha_H {}^L H (T_2 - T_1) +$$
$$(N-X)(P) [\alpha_D - \alpha_S][T_1 - T_{Ref}]$$

where $\alpha_D$, $\alpha_H$, $\alpha_S$ are the linear coefficients of expansion for the disc, head arm and grating respectively.
In order to maintain correct head to track alignment, it is necessary to offset the servo null position by an amount $(-\Delta X)$. This can be accomplished by summing a voltage proportional to $\Delta X$ with the position command as indicated in FIG. 2. This voltage has two separate components, namely,
1) a voltage which is proportional to track location and the temperature differential $(T_2 - T_1)$ and, 2) a voltage proportional to track location and the temperature difference between the base plate and reference $(T_1 - T_{Ref})$. These terms may be expressed analytically as follows:

$$[\alpha_H L_H + \alpha_D K_D + \alpha_D (N-X)P][T_2 - T_1] \quad (1)$$

$$(N-X)P[\alpha_D - \alpha_S](T_1 - T_{Ref}) \quad (2)$$

where $C_1$ and $C_2$ are constants

Figure 3:
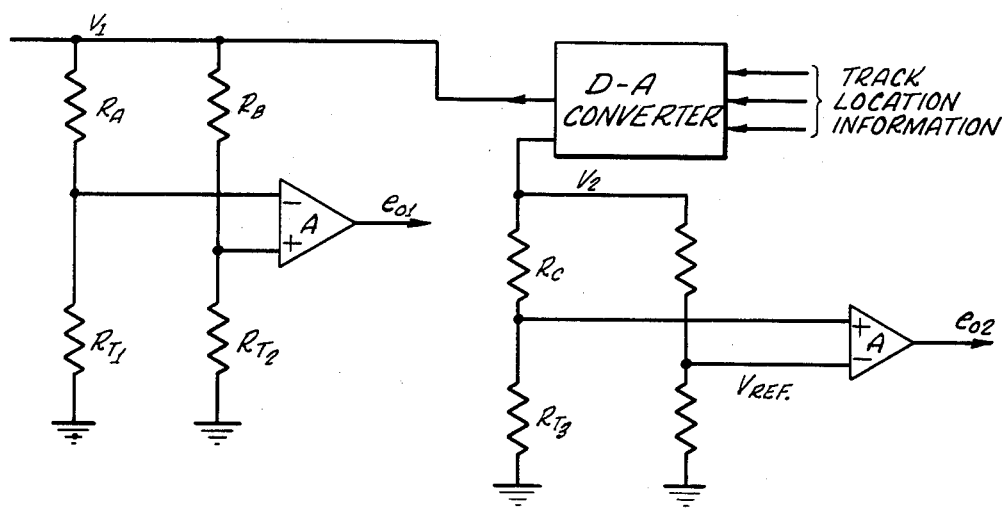
FIG. 3 is a circuit diagram showing how the correction voltage is derived.

FIG. 3 shows a circuit for generating the voltages $e_{01}$ and $e_{02}$. Thermistor $R_{T_1}$ measures the temperature $T_1$ of the base plate 1, thermistor $R_{T_2}$ measures the temperature $T_2$ of the air in the vicinity of the disc and head arm. The voltage $e_{01}$ may be expressed as follows:

$$e_{01} = (A)(V_1)\left[\frac{1}{1+\frac{R_{T2}}{R_A}} - \frac{1}{1+\frac{R_{T1}}{R_B}}\right]$$

where $A$ is the Amplifier Voltage Gain The ratio of $R_{T1}/R_A$ and $R_{T2}/R_B$ may be chosen so as to give a linear voltage/temperature relationship over the desired temperature range. The bridge reference voltage, $V_1$, is derived from a D-A converter with inputs from the disc track (cylinder) address register. Hence $e_{01}$ is proportional to $$[\alpha_H L_H + \alpha_D K_D + \alpha_D (N-X)P][T_2 - T_1]$$

A third thermistor is also located on the base plate in the area of the scale, and is also arranged in a bridge.

$$e_{02} = AV_2\left[\frac{1}{1+\frac{R_{T3}}{R_C}} V_{\text{Ref}}\right]$$

In this case, $V_{Ref}$ is made proportional to temperature at 68°F ($T_{Ref}$) and $V_2 = K(N-X)P$. Hence $e_{02}$ is proportional to $$(N-X)P(\alpha_D - \alpha_S)(T_1 - T_{Ref})$$

Although the basic concept of the invention has been illustrated in connection with a particular application, it will be evident that the teachings of the invention are not limited thereto. It will also be understood that numerous changes, modifications, and substitutions may be made in the basic embodiment without departing from the spirit of the invention.

We claim:

1. In a disk drive system of the type having a movable head which is servoed to the desired track in accordance with a scale located in an environment which is likely to have a different temperature $T_1$ than the temperature $T_2$ of the disk and head arm, the improvement which comprises:

means for generating a first voltage proportional to the track position and the temperature differential between $T_1$ and $T_2$;

means for generating a second voltage proportional to track position and the temperature differential between $T_1$ and a reference temperature $T_3$;

means for summing said first and second voltages together to provide a correcting signal to said servo whereby said head may be accurately positioned to the desired track irrespective of overall temperature variations or differences in the temperatures $T_1$ and $T_2$.

* * * * *